US012681476B2

(12) United States Patent
Cronin et al.

(10) Patent No.: US 12,681,476 B2
(45) Date of Patent: Jul. 14, 2026

(54) EXCAVATION INSPECTION AND CLEARANCE SYSTEM

(71) Applicant: AUSTRALIAN DROID & ROBOT PTY LTD, Taringa (AU)

(72) Inventors: Joe Cronin, Brisbane (AU); Mat Allan, Brisbane (AU)

(73) Assignee: AUSTRALIAN DROID & ROBOT PTY LTD, Taringa (AU)

( * ) Notice: Subject to any disclaimer, the term of this patent is extended or adjusted under 35 U.S.C. 154(b) by 572 days.

(21) Appl. No.: 17/926,224

(22) PCT Filed: May 20, 2021

(86) PCT No.: PCT/AU2021/050476
§ 371 (c)(1),
(2) Date: Nov. 18, 2022

(87) PCT Pub. No.: WO2021/232106
PCT Pub. Date: Nov. 25, 2021

(65) Prior Publication Data
US 2023/0185303 A1     Jun. 15, 2023

(30) Foreign Application Priority Data
May 20, 2020     (AU) ................................ 2020901631

(51) Int. Cl.
*G05D 1/00*          (2024.01)
(52) U.S. Cl.
CPC ......... *G05D 1/0214* (2013.01); *G05D 1/0088* (2013.01)

(58) Field of Classification Search
CPC .... G05D 1/0214; G05D 1/0088; G05D 1/021; G05D 1/0219; G05D 1/0221; G05D 1/0038; G05D 1/0212; G05D 1/0246; G05D 1/0248; G05D 1/0257; G05D 1/027; G05D 1/0274; G05D 1/024; G05D 2201/021; G01S 17/86; G01S 17/89; G01S 17/931;
(Continued)

(56) References Cited

U.S. PATENT DOCUMENTS 6,694,233 B1     2/2004   Duff et al.
7,076,346 B2     7/2006   Sturges et al.
(Continued)

OTHER PUBLICATIONS

International Search report dated Jul. 30, 2021 (5 pages) out of PCT priority application PCT/AU2021/050476.
(Continued)

*Primary Examiner* — Aniss Chad
(74) *Attorney, Agent, or Firm* — Crowell & Moring LLP

(57) ABSTRACT
An excavation inspection and clearance method and system is provided. The method includes: navigating the excavation with one or more autonomous agents; searching, using one or more sensors of the autonomous agents, for persons and/or equipment in proximity of the autonomous agent while navigating the excavation; and determining clear zones around each of the one or more autonomous agents according to a lack of persons and/or equipment in proximity of the autonomous agents while navigating the excavation. The one or more autonomous agents are configured to navigate the excavation such that the clear zones are maintained and can be joined to form a larger clear zone in the excavation.

16 Claims, 6 Drawing Sheets

(58) Field of Classification Search

CPC .. G08C 2200/00; G08C 17/02; E21D 20/003;
E21B 3/00; E21B 7/022; E21B 7/023;
E21B 7/025; E21F 13/08; E02F 9/2033;
E02F 9/262; E02F 9/264; E02F 9/2045;
E02F 9/265; B25J 13/08; B25J 9/1694

See application file for complete search history.

(56) References Cited

U.S. PATENT DOCUMENTS

| | | | |
|---|---|---|---|
| 8,315,789 B2 | 11/2012 | Dunbabin et al. | |
| 2004/0054434 A1 | 3/2004 | Sturges et al. | |
| 2010/0223008 A1 | 9/2010 | Dunbabin et al. | |
| 2012/0095619 A1* | 4/2012 | Pack ................... | G05D 1/0016 |
| | | | 701/2 |
| 2018/0053406 A1 | 2/2018 | Kawamata et al. | |

OTHER PUBLICATIONS

Written Opinion of the International Search Authority dated Jul. 30, 2021 (4 pages) out of PCT priority application PCT/AU2021/ 050476.

* cited by examiner

EXCAVATION INSPECTION AND CLEARANCE SYSTEM

This application is a National Stage application of International Application No. PCT/AU2021/050476, filed May 20, 2021, the entire contents of which are incorporated herein by reference.

This application claims under 35 U.S.C. § 119 (a) the benefit of the filing date of Australian Patent Application No. 2020901631, filed on May 20, 2020, the entire contents of which are incorporated herein by reference.

BACKGROUND OF THE INVENTION

TECHNICAL FIELD

The present invention relates to the inspection of excavations. In particular, although not exclusively, the present invention relates to inspection and clearance of underground mines.

BACKGROUND ART

Underground mining involves the use of various hazardous activities, such as blasting. Prior to performing these high-risk activities, the mine (or a relevant part thereof) must be cleared of people and equipment. This is performed manually, generally by having one or more persons traverse and inspect all relevant areas of the mine to ensure that no persons or equipment remain. Confirmation that the relevant areas of the mine are clear of persons and equipment is then informed to a supervisor or responsible person, who may then approve the hazardous activities based upon such clearance.

A problem with manually clearing relevant areas of the mine in such manner is that it is time consuming and labour intensive. A further problem is that areas of the mine may be themselves dangerous, and as such, it may be difficult to inspect all areas of the mine without the use of additional equipment. A further problem again is that areas may be incorrectly marked as clear as a result of human error, or as a result of persons entering an already inspected area undetected, resulting in high-risk activities being performed in proximity to persons or equipment, potentially resulting in damage to equipment, downtime, or even injury or death to persons. These problems are exacerbated in underground mining environments, where visual inspection can be difficult as a result of poor lighting and environmental conditions, and where the underground environment is typically a series of tunnels, meaning a person is unable to visualise the whole area at once making manual search of the tunnels prone to error.

Similar problems exist in autonomous mining operations, where areas must be cleared of persons and/or equipment prior to operation of autonomous vehicles or equipment. As an illustrative example, autonomous trucks, load haul dump machines and the like may require an area free of persons and obstacles to operate safely and efficiently.

In addition to the abovementioned problems in underground mining, similar problems exist with other types of excavation work, including tunnelling.

As such, there is clearly a need for improved and more reliable excavation inspection and clearance systems.

It will be clearly understood that, if a prior art publication is referred to herein, this reference does not constitute an admission that the publication forms part of the common general knowledge in the art in Australia or in any other country.

SUMMARY OF INVENTION

The present invention is directed to excavation inspection and clearance systems and methods, which may at least partially overcome at least one of the abovementioned disadvantages or provide the consumer with a useful or commercial choice.

With the foregoing in view, the present invention in one form, resides broadly in an excavation inspection and clearance method including:

navigating the excavation with one or more autonomous agents;

searching, using one or more sensors of the autonomous agents, for persons and/or equipment in proximity of the autonomous agent while navigating the excavation; and determining clear zones around each of the one or more autonomous agents according to a lack of persons and/or equipment in proximity of the autonomous agents while navigating the excavation;

wherein the one or more autonomous agents are configured to navigate the excavation such that the clear zones are maintained and can be joined to form a larger clear zone in the excavation.

Advantageously, the method enables an excavation to be cleared in an efficient and systematic manner, which may in turn increase safety and efficiency. By navigating the excavation such that the clear zones are maintained avoids the possibility of persons moving into a clear zone after it has been searched.

The one or more autonomous agents may include a plurality of autonomous agents.

Preferably, the excavation comprises a plurality of interconnected pathways along which the agents may travel. Junctions may join the pathways.

The method may include receiving a map of the excavation, and determining a search strategy for the one or more autonomous agents, wherein the one or more autonomous agents navigate the excavation according to the search strategy.

The method may include generating a graph corresponding to the excavation, wherein edges correspond to pathways along which the agents may travel and nodes correspond to junctions, wherein the search strategy is generated using the graph.

Preferably, the method includes determining a path through the graph for each of one or more robots such that the path creates and maintains the clear zones in the graph.

Preferably the search strategy includes determining that a first autonomous agent of the one or more agents shall monitor an edge and/or node of the graph to maintain a clear zone in one part of the graph, while a second autonomous agent creates and maintains a clear zone in another part of the graph.

The autonomous agents may be configured to share their location with each other. The autonomous agents may be configured to wait for each other. In particular, one autonomous agent may act as sentry while another autonomous agent clears a zone of the excavation.

The autonomous agents may be configured to clear the excavation recursively. In particular, the autonomous agents may clear one zone, and add to the cleared zone recursively.

In one embodiment, a central server may control the autonomous agents. In another embodiment, a master agent controls one or more other slave agents.

Preferably, the method includes signalling the clear zone. The clear zone may be signalled to other equipment, to a server, or to a site manager or other person.

The clear zone may be to a known level of confidence or safety, e.g. to a known safety integrity level (SIL).

Preferably, the one or more autonomous agents are configured to navigate, at least in part, according to data from the one or more sensors.

Preferably, the autonomous agents are configured to stay with a person upon identification of a person. Suitably, the autonomous agents may enable persons to communicate with a remote person, such as a site manager. The autonomous agents may transmit a location of the person to the remote person. The autonomous agent may assist the person, by providing the person with items the autonomous agent may be carrying (e.g. first aid, water).

Preferably, the autonomous agent is configured to identify equipment. Suitably, the autonomous agent may attempt to read an identifier from identified equipment. The identifier may include a serial number, a code or any other suitable identifier associated with the equipment.

The autonomous agent may be configured to send images of identified equipment to a remote person. The remote person may confirm whether the identified equipment must be cleared.

The method may include multiple autonomous agents configured to operate together to search the excavation. The autonomous agents may be configured to be able to identify each other.

The sensors may include one or more distance/range sensors, such as LiDAR, sonar, radar sensors.

The sensors may include one or more image sensors, such as cameras. The autonomous agents may include a light to illuminate a field of view of the image sensors. The image sensors may also include sensors that operate in the visible spectrum. Alternatively or additionally, the image sensors may include hyperspectral cameras, thermal cameras, infrared cameras, or a combination thereof.

The sensors may include a combination of image and distance/range sensors. The sensors may include at least overlapping fields of view.

The sensors may be configured to generate three-dimensional data relating to the excavation. The search may include comparing three-dimensional data to expected three-dimensional data based upon the environment. E.g. a moving object may be indicative of a person.

The autonomous agents may include an inertial measurement unit (IMU) to assist in navigation. The inertial measurement unit may include any combination of sensors (e.g., accelerometers and gyroscopes) configured to sense position and orientation changes of the autonomous agents based on inertial acceleration.

The autonomous agents may be configured to determine blind spots while navigating, and autonomously navigate to avoid (or fill in) the blind spots.

The excavation may include an area defined by one or more boundaries. The boundaries may include virtual boundaries (e.g., a light curtain) or physical boundaries (e.g., a gate or barrier).

The autonomous agents may include robots. The robots may include wheeled robots. In one embodiment, the robots are less than about 1 m in height, width and length. Alternatively, the autonomous agents may include drones, or any other suitable agent.

The method may be performed prior to any high risk activity, such as blasting or autonomous or semi-autonomous operation of equipment.

In another form, the invention resides broadly in an excavation inspection and clearance system including one or more autonomous agents configured to:

navigate the excavation;

search, using one or more sensors of the autonomous agents, for persons and/or equipment in proximity of the autonomous agent, while navigating the excavation; and determine clear zones around each of the one or more autonomous agents according to a lack of persons and/or equipment in proximity of the autonomous agents while navigating the excavation;

wherein the one or more autonomous agents are configured to navigate the excavation such that the clear zones are maintained and can be joined to form a larger clear zone in the excavation.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which.

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way.

DESCRIPTION OF EMBODIMENTS

Embodiments of the present invention are disclosed which provide a safe, efficient and accurate means for clearing an excavation, such as a mine or a tunnel, from persons and equipment. This may improve safety in the excavation, by ensuring that the excavation is free from persons and equipment prior to deploying any high-risk activities, such as blasting or operation of autonomous or semi-autonomous machines.

Figure 1:
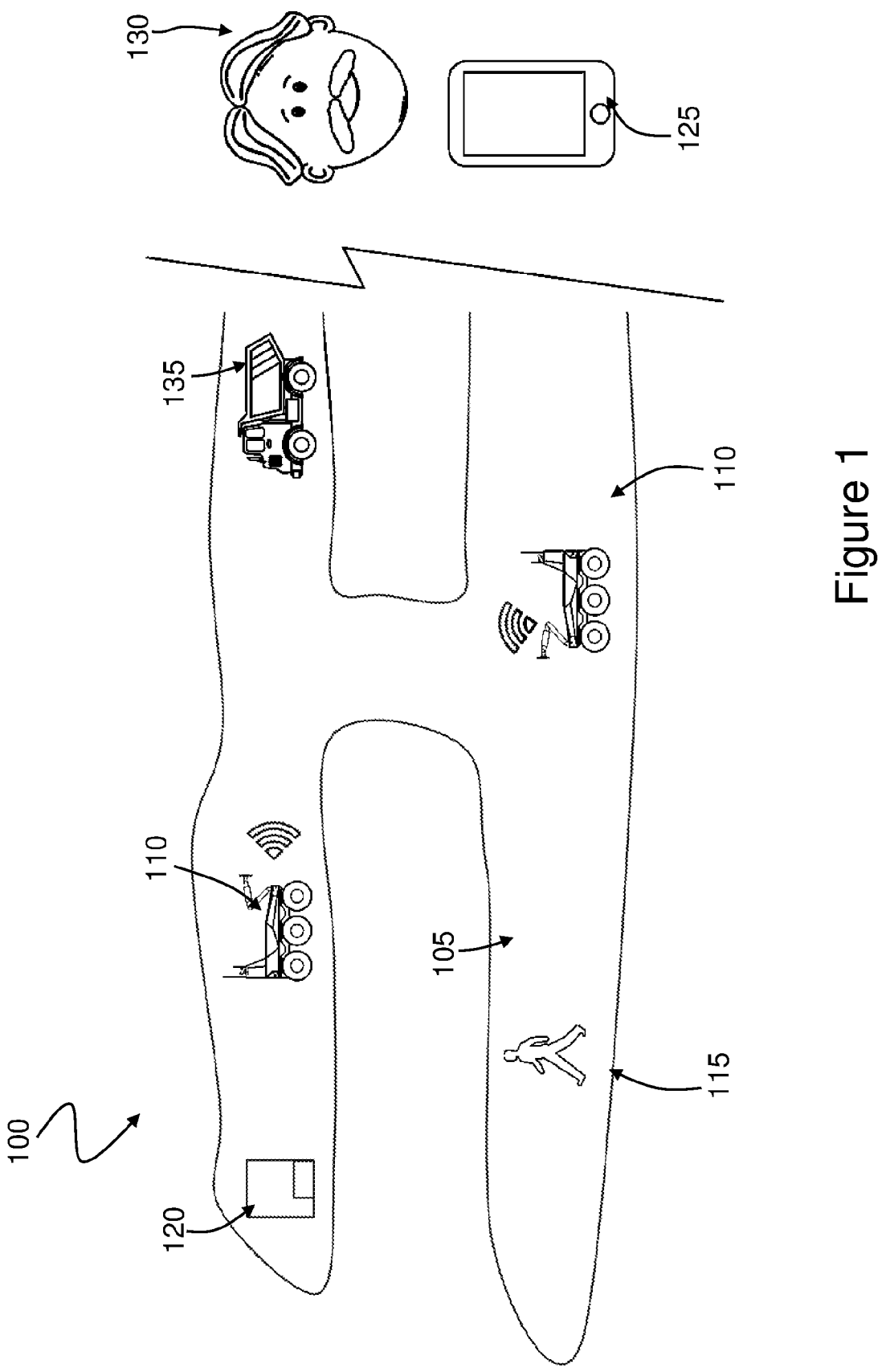
FIG. 1 illustrates a schematic of an excavation inspection and clearance system, according to one embodiment of the present invention.

FIG. 1 illustrates a schematic of an excavation inspection and clearance system 100, according to one embodiment of the present invention. The excavation includes underground tunnels 105, which have been excavated from the surrounding material and which may, for example, be tunnels of an underground mine. The tunnels 105 may include comprise an interconnected network of tunnels, through which equipment and persons may travel.

The excavation inspection and clearance system 100 includes a plurality of autonomous agents in the form of wheeled robots 110, which are configured to autonomously navigate in the tunnels 105 to identify any persons 115 or equipment 120 in the tunnels 105. If a person 115 is identified, the robot 110 may issue a warning to a portable computing device 125 of a site manager 130, or other suitably qualified person or persons.

The robot 110 may send information relating to the person 115 to the portable computing device 125 for display to the site manager 130, such as location information of the user, and may even enable the person 115 to communicate with the site manager 130. Furthermore, the robot 110 may stay with, or follow the person 115, to ensure that a location of the person 115 is not lost.

The system 100 includes an autonomous vehicle 135, configured to operate autonomously in the tunnels 105, and the robots 110 are clearing the tunnels of persons 115 and equipment 120 to enable the autonomous vehicle 135 to operate safely and efficiently. In other embodiments, the autonomous vehicle 135 may be replaced by other high-risk activities such as blasting, wherein the robots 110 clear the tunnels 105 prior to the blasting.

When a person 115 is identified, the robot 110 may also place an emergency stop on any ongoing or upcoming high-risk activities, e.g. by communicating directly with equipment associated with the high-risk activity. Such emergency stop may be particularly useful in preventing the autonomous vehicle 135, or any other associated equipment or activities, from inadvertently being initiated.

When equipment 120 is identified, the robot 110 may attempt to identify the equipment using image analysis. This could include attempting to locate identification indicia on the equipment, or analysing the size and shape of the equipment, for example. Furthermore, the robot 110 may provide to the site manager 130 images of the equipment, to enable the site manager 130 to confirm whether the equipment needs to be cleared or not. In case the site manager 130 determines that the equipment need not be cleared, this may be logged on the robot, upon which it may continue to clear the mine, ignoring that equipment.

Once the robots 110 determine that the tunnels 105 are clear of persons and equipment, the robots 110 may signal that the area is clear. Each robot 110 may be associated with a particular part of the tunnels 105, and may signal which parts of the tunnels 105 it has cleared. Alternatively, the robots 110 may work together to clear the tunnels 105, and signal together that the tunnels have been cleared.

The site manager 130 may then approve operation of the autonomous vehicle 135, or other high-risk activities.

Figures 2, 3, 4, 5:
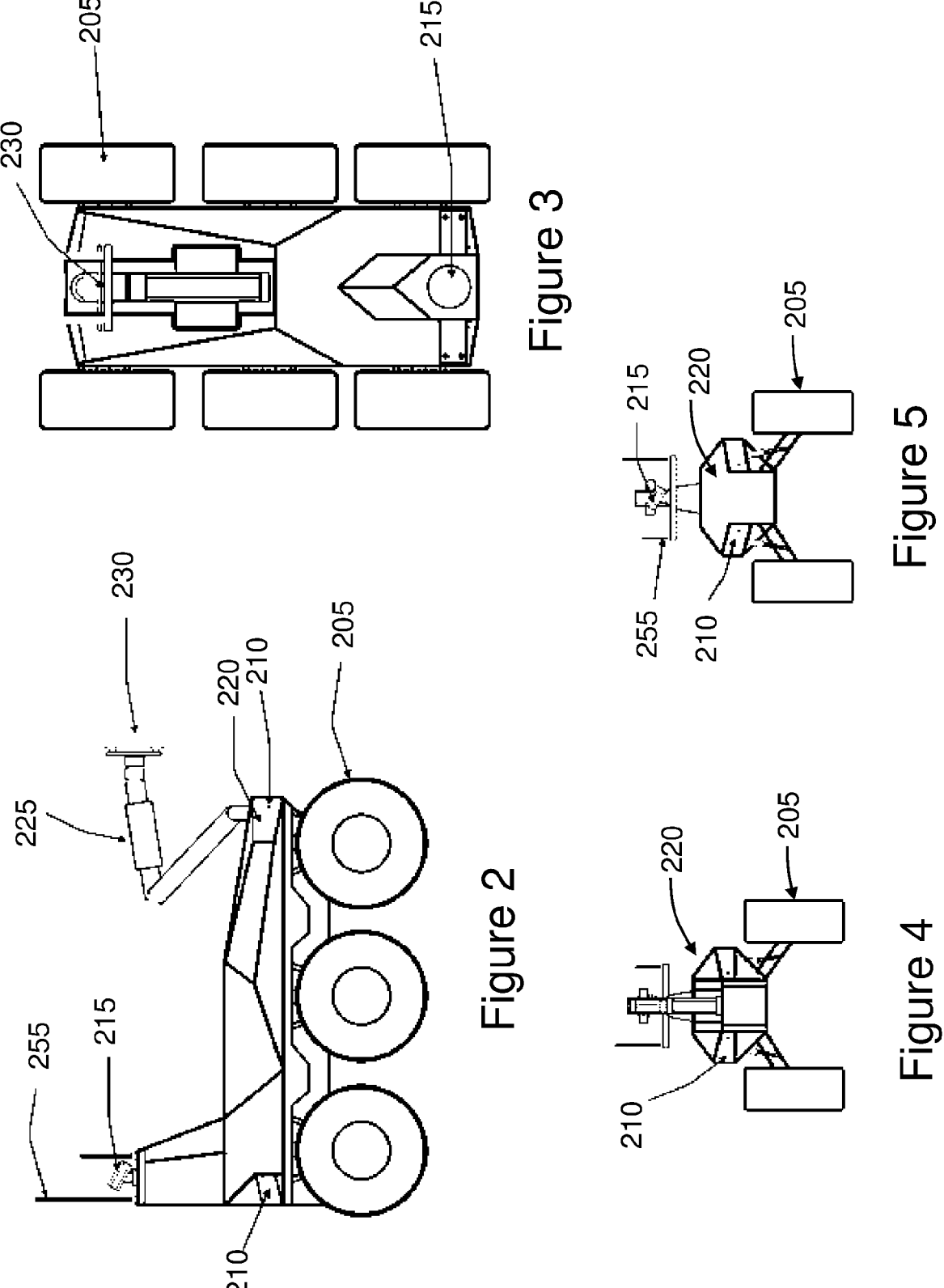
FIG. 2 illustrates a side view of a robot of the system of FIG. 1, according to one embodiment of the present invention.
FIG. 3 illustrates a top view of the robot of the system of FIG. 1, according to one embodiment of the present invention.
FIG. 4 illustrates a front view of the robot of the system of FIG. 1, according to one embodiment of the present invention.
FIG. 5 illustrates a rear view of the robot of the system of FIG. 1, according to an embodiment of the present invention.
Figure 6:
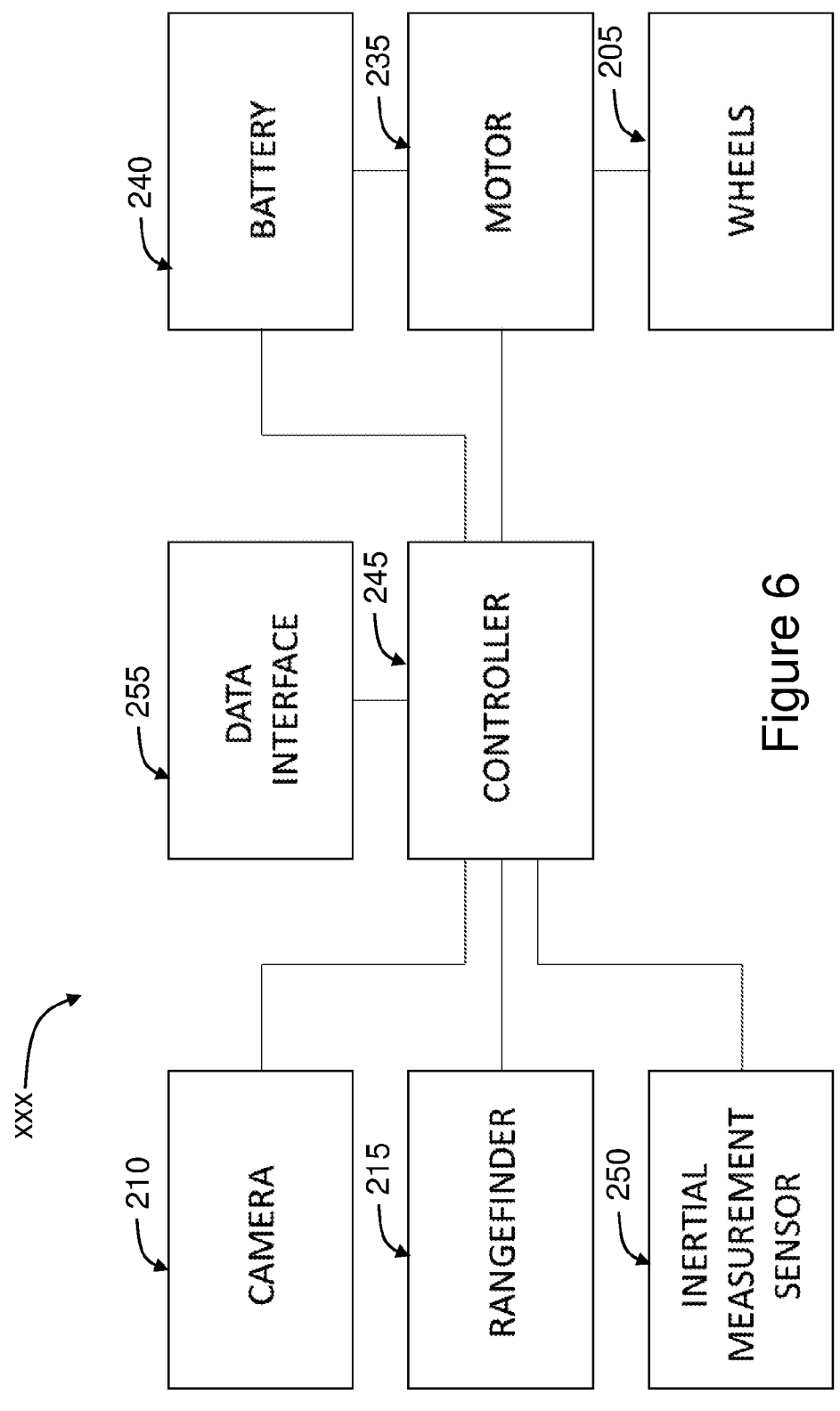
FIG. 6 illustrates a schematic of the robot of the system of FIG. 1, according to one embodiment of the present invention.

FIG. 2 illustrates a side view of a robot 110, FIG. 3 illustrates a top view of the robot 110, FIG. 4 illustrates a front view of the robot 110 and FIG. 5 illustrates a rear view of the robot, according to an embodiment of the present invention. FIG. 6 illustrates a schematic of the robot 110.

The robot 110 includes six wheels 205, arranged in parallel rows, enabling the robot 110 to navigate in tunnels and other excavations, and a plurality of sensors, including image sensors 210 and range sensors 215, enabling the robot to autonomously navigate in the tunnels or excavations based upon sensor data relating to its surroundings.

The robot 110 includes a body 220, mounted to the wheels 205. The wheels 205 are mounted to the body 220 such that high clearance is provided under the body to enable navigation over rocks and uneven surfaces. The sensors 210, 215 are also used to enable the robot 110 to automatically avoid large obstacles.

The sensors 210, 215 are configured such that they have a common, or at least overlapping field of view. This enables the image data from the image sensors 210 and the range or distance data from the range sensors 215 to be considered together. This enables better data to be captured relating to the surroundings of the robot than if only a single type of sensor (i.e. image or range/distance) were used.

The sensors 210, 215 are also configured to capture a wide field of view, both in front of the robot 110 and behind. The wide field of view is important for clearing tunnels and underground excavations, as it ensures that persons and equipment are not missed from falling outside of the field of view of the robot 110.

The range sensors 215 comprise reflection-based sensors, such as LiDAR, sonar, and radar, which enable a three-dimensional model or point cloud of the area surrounding the robot 110 to be generated.

The image sensors 220 include cameras, which may include or be associated with a light to illuminate the area to which image data is being captured. The cameras may capture image data in the visible spectrum, but may also include hyperspectral cameras, thermal cameras, infrared cameras, or a combination thereof.

The robot 110 includes an actuator in the form of a robotic arm 225, which may articulate, and may include sensors or other items 230 attached thereto. As an illustrative example, the robot 110 may include robotic arms, drills, cutters, or digging implements, to enable the robot to perform auxiliary functions that may be beneficial in a mine site.

As outlined above, the robot 110 includes wheels 205, to enable navigation of the robot 110 in the excavation. The wheels are each coupled to a motor 235 (of potentially multiple motors), to enable the robot to navigate across uneven surfaces often found in excavations. The motor 235 is in turn coupled to a battery 240 (or multiple batteries) to drive the motor 235.

The skilled addressee will readily appreciate that the motor 235 and battery 240 are an example of a propulsion system, but other systems may be used, including combustion or gas-powered engines, or a combination thereof.

As outlined above, the robot 110 uses sensor data, together with map data, to autonomously navigate in the excavation. In this regard, the sensors 210, 215 are coupled to a controller 245, which receives the sensor data and uses that as input to navigation. The controller 245 is also coupled to the motor 235, and thereby the wheels 205, to enable controlled navigation.

In addition to utilising the sensor data from the camera 210 and rangefinder 215, the robot 110 includes an inertial measurement sensor 250, such as an accelerometer or gyroscope. The controller 245 is able to process the data of the camera 210, rangefinder 215 and inertial measurement sensor 250 together to get an accurate understanding of the movement of the robot 110 in the excavation. This is particularly important when GPS and similar navigation systems are not available, as is often the case in excavations.

The robot 110 includes a wireless data interface 255 to enable different robots 110 to communicate with each other, and to other devices, such as the computing device 125. The robot 110 may also receive a map of the excavation on the wireless data interface 255.

Finally, the robot 110 may include a variety of other parts, sensors components and/or accessories, to enable the robot 110 to function in a wide range of scenarios, or to provide additional or complementary functionality. As an illustrative example, the robot may include a safety or first aid kit. Similarly, the robot may include environmental sensors (e.g. gas sensors).

The robot 110 may be any suitable size, but is generally compact to enable to efficiently traverse a wide range of excavations. In one embodiment, the robot is less than about 1 m in length, width, and height.

In use, one or more robots 110 receive a map of the excavation (e.g. a group of tunnels), or a position or portion thereof, defining an area which is to be cleared, on the data interface. The robots 110 then creates a planned path to clear the excavation or portion thereof, and navigate through the excavation according to the path, the map and sensor data from the sensors 210, 215. The path may ensure that the robot 110 travels along all aspects of the excavation and in a manner that enables all parts thereof to be searched.

Alternatively, a controller may receive the map and create a planned path to clear the excavation. In such case, the robots 110 may receive vectors or a series of coordinates defining the paths to be travelled.

Once the robot 110 has determined or received a path, the robot 110 travels along that path, taking into account local variations, such as rocks or the like, autonomously navigating around these, while simultaneously capturing sensors data of its surroundings to identify persons or equipment.

In particular, the robot 110 navigates along the path in such manner that it is able to, and captures, all angles of the excavation. In the case of a tunnel, this will generally involve the robot 110 navigating centrally down the tunnel. In case there is an occlusion, the robot may navigate such that data relating to any occluded area is captured without losing sight of the rest of the area being inspected. This is particularly important in identifying persons to ensure that a person is able to avoid detection by moving from an occluded area to a previously searched area. Such manner ensures that a path is not only searched, but actually cleared of persons.

Various algorithms may be used to determine the paths of the robots 110 to clear the excavation, while ensuring that persons and equipment are unable to enter unnoticed.

Generally, a graph may be generated from a map of the excavation, where end-points and junctions are represented by vertices, and edges represent the tunnels or pathways between the end-points and junctions.

Each of the edges of the graph is initially set as "non-clear" zones (i.e. they haven't been cleared by robots). The edges are then set as "clear" when they have been inspected by a robot, while ensuring that they not exposed to an area that is not-clear. Ensuring that the edges are not exposed to an area (edge) that is not clear can be performed a variety of ways including clearing the excavation from a closed or secured end, and/or by maintaining a barrier (e.g. using a robot as a sentry) at a node between a clear and not-clear area edge.

Importantly, maintaining a clear zone (and boundary between clear and non-clear zones), ensures that persons cannot enter a clear zone from a non-clear zone during the search, and thereby can guarantee a zone is ultimately clear of persons, unlike traditional graph search algorithms that simply visit each edge without maintaining a clear zone.

Once all edges are marked as clear, the excavation is guaranteed to not have an persons therein, as the clear zones have been maintained during the process, e.g. by working back from ends and/or by placing sentries or alarms at relevant junctions.

In practice, a complex graph may be split into a plurality of sub-graphs, corresponding to segments of the excavation. Each sub-graph, may be cleared individually and guarded by a robot until two or more of the sub-graphs can be joined to become larger sub-graphs, and ultimately the entire graph is cleared.

Furthermore, searching will generally begin at nodes at ends of the graph, such that a single robot is able to clear edges back therefrom. In such case, the graph may be split into a plurality of trees (graphs), wherein the robots work from leaves (outer nodes or end points of the excavation) back towards the trunk while maintaining clear areas behind them by ensuring that any cleared branches remain guarded/blocked by a robot.

In addition to simply determining a search strategy that guarantees that the excavation is clear, the search strategy may be configured to optimize a search time given a defined number of robots. Alternatively, a search strategy may be defined that minimizes the number of robots needed.

In some excavations, loops (circular paths) may be defined by edges. In such case, and to avoid endless loops, the loops may be broken by placing a robot as sentry in the loop (or otherwise providing a barrier), turning the loop into a path having ends.

In some embodiments, the robots have fairly short range sensors, and are configured to navigate along each edge of the graph. In other embodiments, the robots may include long range sensors enabling them to clear edges without necessarily navigating the edge, or by only partially navigating the edge.

As each area of the graph is cleared, this is communicated with the remaining robots, to enable zones that have been cleared by multiple robots to be merged into larger clear zones. This enables robots that are acting as sentry on a part of a cleared area to be released to clear other areas.

While robots will generally ensure that a cleared zone remains clear, in some situations, a robot may be unable to do so, e.g. due to a malfunction. In such case, the robot will mark an area as being non-clear, and any area connected to that non-clear area without a barrier therebetween (e.g. a robot as sentry) will also become non-clear. In such case, the robot will communicate this non-clear area to the other robots (and/or a controller), upon which a new search strategy will be initiated, to re-search any non-clear areas.

Figure 7:
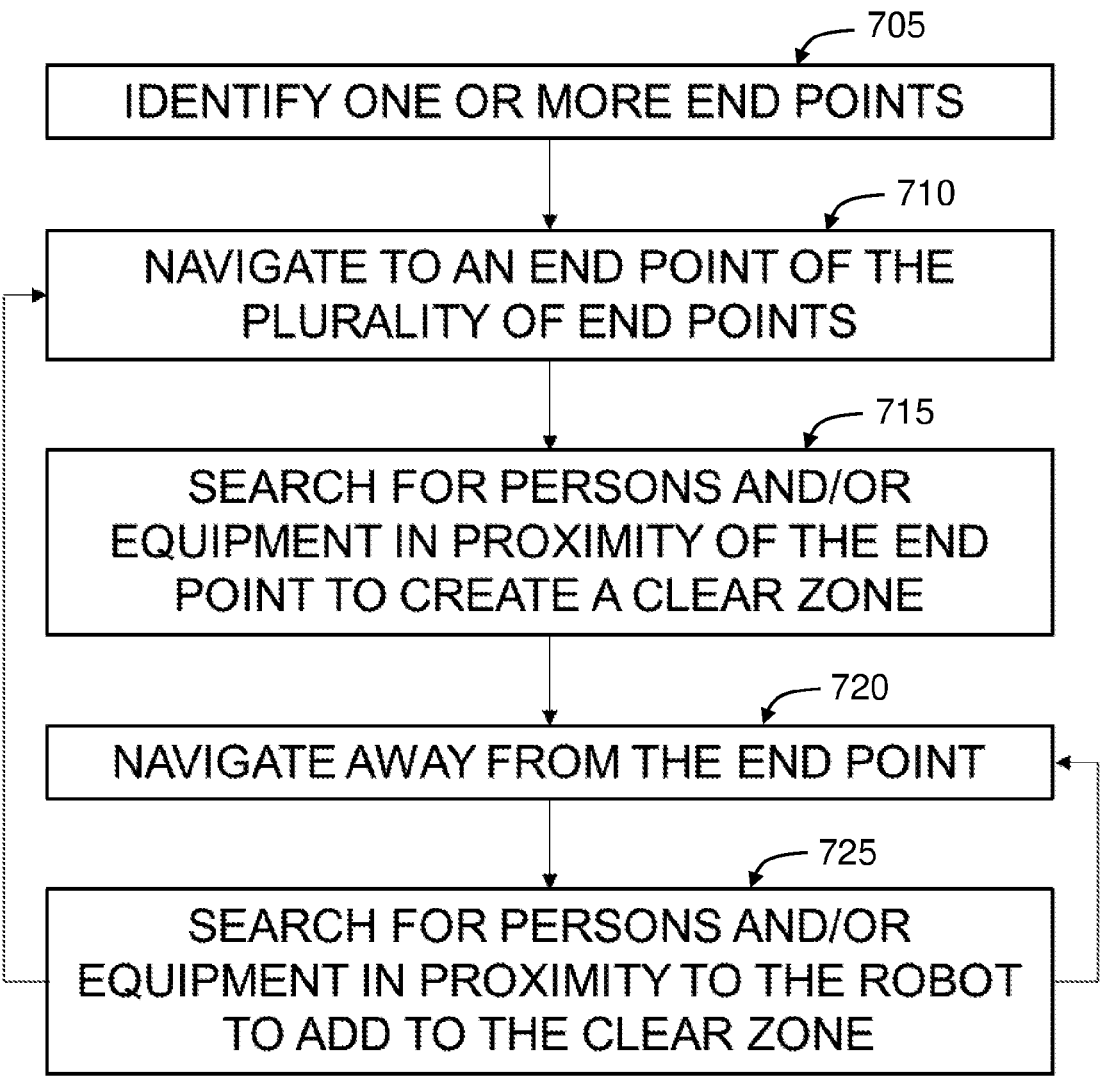
FIG. 7 illustrates an exemplary method of inspecting and clearing an excavation, according to an embodiment of the present invention.

FIG. 7 illustrates an exemplary method 700 of inspecting and clearing an excavation, according to an embodiment of the present invention. The method 700 may be similar to the method performed by the robots 110 in the system 100, and may be based upon a graph-based search strategy, as outlined above.

At step 705, one or more end points of the excavation are identified. The end points will generally include a dead-end, or a portion of the excavation that is blocked from access, and correspond to a leaf node in a graph. As an illustrative example, the end point may include a portion of a tunnel blocked by a physical barrier, or a virtual barrier such as a light curtain, which triggers an alarm if passed.

At step 710, an autonomous agent (e.g. a robot) autonomously navigates to an end point of the one or more end points. This may be achieved with reference to a map, and using sensor data from the autonomous agent.

At step 715, the autonomous agent searches for persons and/or equipment in proximity to the end point. This is achieved using sensors, including range/distance and image sensors. Once the area has been searched, and confirmed to be clear of persons and/or equipment, an initial clear zone is created.

At step 720, the autonomous agent navigates away from the end point, and in step 725, searches for persons and/or equipment in proximity to the autonomous agent to add to the clear zone. These steps are repeated as the autonomous agent navigates away from the end point leaving a clear zone behind it.

While steps 720 and steps 725 are illustrated as being performed sequentially (and repeated), the skilled addressee will readily appreciate that in practice these steps may be performed continuously. In particular, the search to add areas to the clear zone may be performed while the autonomous agent is navigating away from the end point.

The areas searched are generally overlapping, and the search is performed in a continuous or semi-continuous manner to ensure that persons or equipment are unable to enter a clear zone. As an illustrative example, if a search is performed in a semi-continuous manner, searches may be performed at such high intervals (e.g. a search every second) to ensure that persons or equipment are unable to pass the autonomous agent and enter the clear zone.

Steps 710 to 725 are then repeated for each end point. This may be performed sequentially, or in parallel using a different robot.

To ensure that a clear zone remains clear, an autonomous agent may stay as a sentry at an edge of the clear zone. Alternatively, the autonomous agent may deploy one more sensors or items to act as an alarm or sentry at an edge of the clear zone.

As will be readily understood by the skilled addressee, different excavation configurations will require different numbers of autonomous agents, primarily depending on the way the excavation branches. Furthermore, different algorithms may optimise different parameters depending on requirements and available robots. For example, in one situation it may be desirable to reduce search time, whereas in another situation it may be desirable to reduce numbers of robots or repeated path travel.

Figures 8, 9:
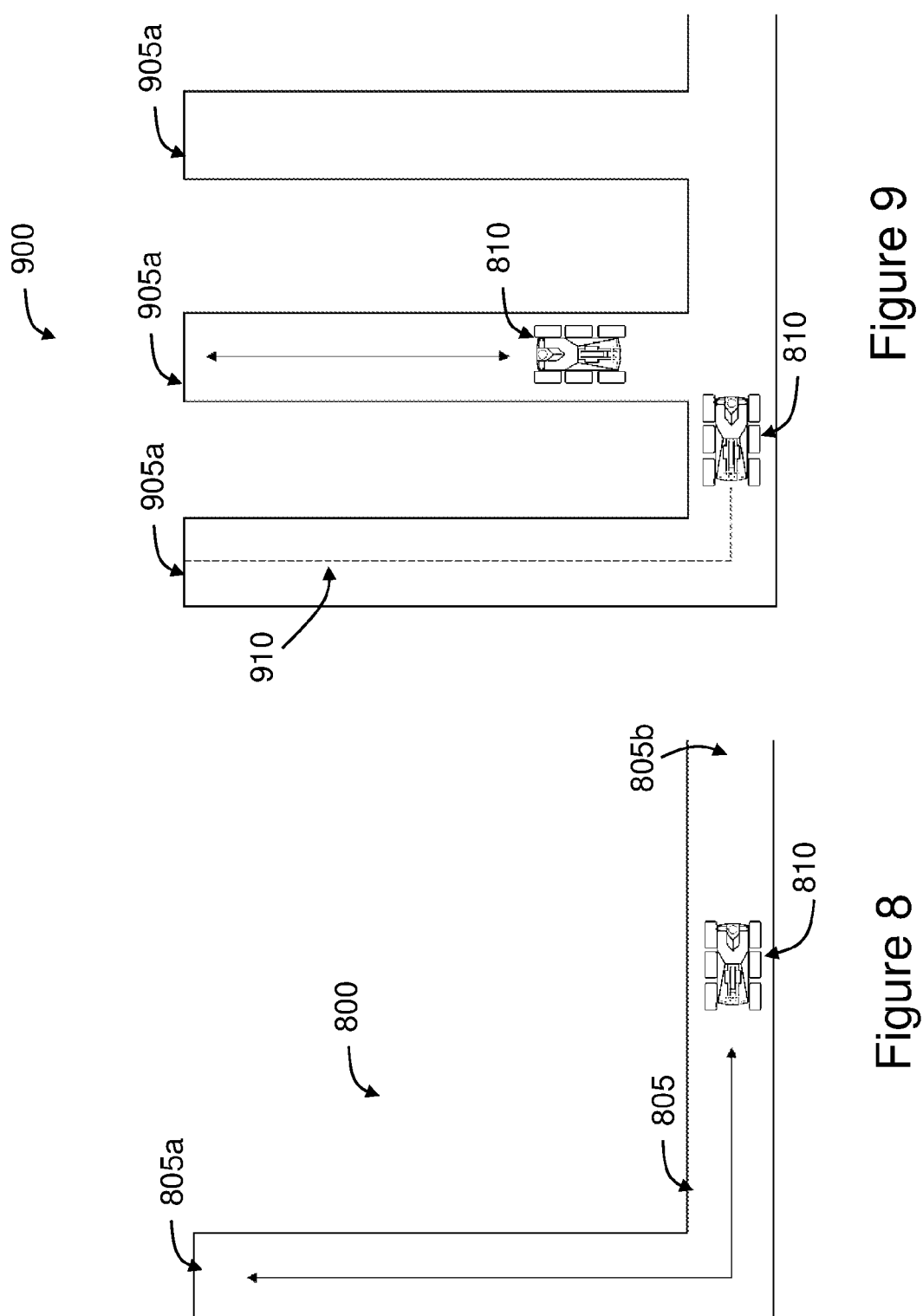
FIG. 8 illustrates an exemplary underground excavation comprising a tunnel.
FIG. 9 illustrates another exemplary underground excavation comprising a tunnel having multiple branches.

FIG. 8 illustrates an exemplary underground excavation 800 including a tunnel 805 having a single pathway and a single end point 805a and a single entry 805b. In such case, a single robot 810, which may be similar or identical to the robot 110, is able to navigate to the end point 805a, and back to the entry 805b, while searching for persons and equipment on the way, and while ensuring that no persons enter the tunnel 805.

FIG. 9 illustrates another exemplary underground excavation 900 including a tunnel 905 having multiple branches, and therefore multiple end point 905a and a single entry 905b. In such case, two robots 810 are able to clear the mine as follows. One of the robots 810 clears the furthest branch by navigating to the end point 905a thereof and back to the branch with the second furthest end point to create a cleared zone 910 in the furthest branch. This robot acts as a sentry to the zone it has cleared while the other robot 810 clears the second furthest branch by navigating to the end point 905a thereof and back to the branch.

At this point, the robots 810 meet and the cleared zones of the first and second robots 810, corresponding to the furthest and second furthest branch, are merged. One of the robots 810 may acts as a sentry to the merged cleared zone, while the other robot 810 clears the final branch.

In case the excavation were to include further branches, the process may be repeated with further cleared zones from the further branches merged with the existing clear zone.

Figure 10:
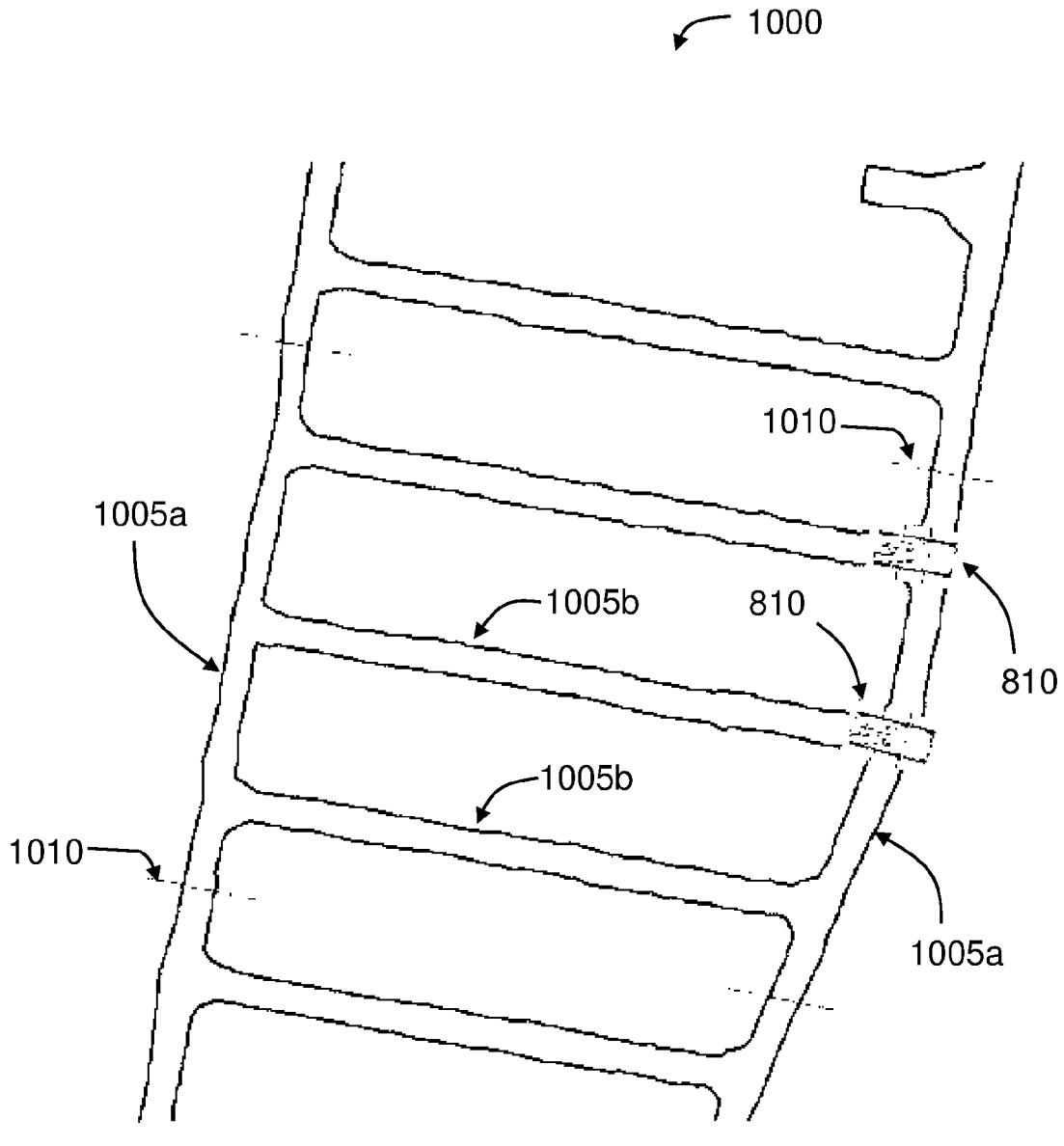
FIG. 10 illustrates yet another exemplary underground excavation comprising multiple access drives with tunnels extending therebetween.

FIG. 10 illustrates yet another exemplary underground excavation 1000 including multiple access drives 1005a with tunnels 1005b extending therebetween. The excavation 1000 includes a section of an underground mine, which has boundaries defined in part by gates 1010, which may include physical barriers or virtual barriers (e.g. a light curtain which triggers an alarm).

In this case, two robots 810 are used to clear the mine as follows. One of the robots 810 stays as a sentry at the access drive 1005a to ensure that persons do not move from one drive to another without detection. The other robot 810 then searches the other drive 1005a and tunnels 1005b.

In case the excavation was to include nested branches, i.e. branches within branches, the search process may be completed in a nested nature. In particular, each branch may be searched and merged with its parent branches. This may require a number of robots depending on the number of nested branches to ensure that a robot is able to act as sentry to each of the branches.

Finally, if the excavation were to include a circuit (or loop), a robot may create a barrier, similar to an end point, by acting as a sentry along a portion of the circuit while another robot navigates the circuit. In such case, the circuit may then be treated as a path having a start and end (being either side of the sentry).

In general, excavations for which embodiments of the invention are particularly suited comprise interconnected pathways along which the agents (e.g. robots) may travel, and junctions may join pathways. In such case, there is generally no line of sight across the entire area, meaning that if care is not taken, persons could enter the area during a search undetected. Embodiments of the invention are also well suited to environments where line of sight is occluded by other obstacles.

The skilled addressee will readily appreciate that these are simply exemplary configurations, and that the methods and systems described above may be adapted to any suitable excavation. In complex excavations, the excavation will generally be broken down into components which are cleared, recursively, such that the cleared zones are merged.

Similarly, different sensors may have different scopes of coverage, meaning that more or fewer robots may be needed. In particular, if a robot is able to see down a tunnel, it may not need to travel down the tunnel, and therefore may monitor two tunnels simultaneously. Furthermore, robots with relatively large coverage areas may be able to communicate their coverage areas with each other, so that different robots may cover an entire area without necessarily seeing each other.

In general, the robots will ensure that search areas overlap, and that any cleared areas remain cleared. Similarly, the robots may determine blind spots (occlusions), and autonomously navigate to avoid such blind spots.

Any suitable algorithm may be used to identify persons and equipment. In one embodiment, three-dimensional data of the environment may be compared to expected data of the environment. As an illustrative example, an object that is distinct from the walls may be indicative of a person or equipment. Similarly, movement, heat and factors may be used to identify persons.

Similarly, machine learning models, neural networks and/or artificial intelligence may be used to identify persons and equipment. In particular, neural networks may be trained to detect objects in image data, and multiple layers may be used for prediction, in deep neural networks.

While the above-described robots are able to operate autonomously, the robots may be configurable to operate in a remote controlled mode. This may be particularly useful when it is desired to use the robot for other purposes, such as a repair, particularly in an area where it is unsafe for humans.

While the above embodiments describe the use of multiple robots, particularly robots acting as sentry, in other embodiments the robots may temporarily deploy sensors at an opening of a branch to ensure that the branch remains clear without having to physically remain at the opening of the branch.

While the above embodiments disclose wheeled robots, the skilled address will readily appreciate that other types of autonomous agents may be used, including tracked autonomous vehicles, other types of robots, drones or the like.

Similarly, while the above embodiments include robots that define travel paths and coordinate with each other, in another embodiment a central server may control robots. In yet an alternative embodiment, the robots may include a 'master' robot which controls other 'slave' robots.

The excavation may include sensors fixed in areas around the excavation that can be used to autonomously monitor an area, in collaboration with the robots. As an illustrative example, sensors may be used to monitor one part of an excavation, whereas the robots inspect others.

The systems and methods described above may be used prior to high-risk activities, such as blasting or to allow autonomous or semi-autonomous operation of equipment.

Advantageously, embodiments of the invention described above enable an excavation to be cleared in an efficient and systematic manner. This may also enhance safety as it is less likely that persons and equipment are inadvertently present when high-risk activities are undertaken. In one embodiment, the level of safety achieved may relate to a known level of safety, such as a safety integrity level (SIL).

The embodiments are particularly suited for use in excavations where other navigation technology, such as GPS, is unavailable.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. An excavation inspection and clearance method comprising:
   navigating an excavation with a plurality of autonomous agents;
   generating a graph corresponding to the excavation, wherein edges correspond to pathways of the excavation along which the plurality of autonomous agents may travel and nodes correspond to junctions joining the pathways;
   determining a search strategy using the graph;
   searching, according to the search strategy and using one or more sensors of each of the plurality of autonomous agents, to identify at least one of persons and equipment in proximity of the plurality of autonomous agents while navigating the excavation; and
   determining clear zones around each of the plurality of autonomous agents according to at least one of a lack of persons and a lack of equipment in proximity of the plurality of autonomous agents while navigating the excavation;
   wherein a first autonomous agent of the plurality of autonomous agents monitors at least one of an edge and a node of one portion of the graph while a second autonomous agent of the plurality of autonomous agents creates and maintains a clear zone in another part of the graph;
   wherein the graph includes a plurality of sub-graphs, cleared individually and monitored by an autonomous agent of the plurality of autonomous agents until two or more of the sub-graphs can be joined to become larger sub-graphs, and the entire graph is cleared, and
   wherein the plurality of autonomous agents are configured to navigate the excavation such that the clear zones are maintained and can be joined to form a larger clear zone in the excavation.

2. The excavation inspection and clearance method of claim 1, further comprising receiving a map of the excavation.

3. The excavation inspection and clearance method of claim 1, further comprising determining a path through the graph for each of the plurality of autonomous agents such that the path creates and maintains a clear zone in the graph.

4. The excavation inspection and clearance method of claim 1, wherein the plurality of autonomous agents are configured to share their location with each other.

5. The excavation inspection and clearance method of claim 1, wherein the plurality of autonomous agents are configured to determine clear zones of the excavation recursively.

6. The excavation inspection and clearance method of claim 1, wherein a central server may control the plurality of autonomous agents.

7. The excavation inspection and clearance method of claim 1, wherein a master autonomous agent of the plurality of autonomous agents controls one or more other slave autonomous agents of the plurality of autonomous agents.

8. The excavation inspection and clearance method of claim 1, further comprising signaling the clear zone.

9. The excavation inspection and clearance method of claim 1, wherein the plurality of autonomous agents are configured to navigate, at least in part, according to data from the one or more sensors.

10. The excavation inspection and clearance method of claim 1, wherein each of the plurality of autonomous agents is configured to stay with a person upon identification of a person.

11. The excavation inspection and clearance method of claim 1, wherein the plurality of autonomous agents are configured to identify equipment.

12. The excavation inspection and clearance method of claim 1, wherein the one or more sensors comprise one or more distance/range sensors.

13. The excavation inspection and clearance method of claim 1, wherein the one or more sensors comprise one or more image sensors.

14. The excavation inspection and clearance method of claim 1, wherein the one or more sensors are be configured to generate three-dimensional data relating to the excavation.

15. The excavation inspection and clearance method of claim 1, wherein the plurality of autonomous agents comprise an inertial measurement unit (IMU) configured to sense position and orientation changes of the plurality of autonomous agents based on inertial acceleration.

16. An excavation inspection and clearance system comprising:

a plurality of autonomous agents configured to:

navigate an excavation;

generate a graph corresponding to the excavation, wherein edges correspond to pathways of the excavation along which the plurality of autonomous agents may travel and nodes correspond to junctions joining the pathways;

determine a search strategy using the graph;

search, according to the search strategy and using one or more sensors of the plurality of autonomous agents, to identify at least one of persons and equipment in proximity of the plurality of autonomous agents, while navigating the excavation; and determine clear zones around each of the plurality of autonomous agents according to at least one of a lack of persons and equipment in proximity of the plurality of autonomous agents while navigating the excavation;

wherein a first autonomous agent of the plurality of autonomous agents monitors at least one of an edge and a node of one portion of the graph while a second autonomous agent of the plurality of autonomous agents creates and maintains a clear zone in another part of the graph;

wherein the graph includes a plurality of sub-graphs, cleared individually and monitored by an autonomous agent of the plurality of autonomous agents until two or more of the sub-graphs can be joined to become larger sub-graphs, and the entire graph is cleared; and wherein the plurality of autonomous agents are configured to navigate the excavation such that the clear zones are maintained and can be joined to form a larger clear zone in the excavation.

\* \* \* \* \*